US011890858B2

(12) United States Patent
Achi et al.

(10) Patent No.: US 11,890,858 B2
(45) Date of Patent: Feb. 6, 2024

(54) COATING APPARATUS AND IMAGE FORMING SYSTEM

(71) Applicants: Keita Achi, Kanagawa (JP); Isao Matsushima, Ibaraki (JP)

(72) Inventors: Keita Achi, Kanagawa (JP); Isao Matsushima, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 17/369,224

(22) Filed: Jul. 7, 2021

(65) Prior Publication Data

US 2022/0032657 A1 Feb. 3, 2022

(30) Foreign Application Priority Data

Aug. 3, 2020 (JP) ................................ 2020-131660

(51) Int. Cl.

*B41J 11/00* (2006.01)
*B41M 5/00* (2006.01)
*B41J 2/16* (2006.01)
*B05C 1/08* (2006.01)

(52) U.S. Cl.

CPC ......... *B41J 11/0015* (2013.01); *B05C 1/0813* (2013.01); *B41J 2/1606* (2013.01); *B41M 5/0017* (2013.01)

(58) Field of Classification Search

CPC .... B41J 11/0015; B41J 29/377; B41J 13/025; B41M 5/0011; B41M 5/0017; B41M 5/508; B05C 1/0813; B41F 19/001; G03G 15/0896

See application file for complete search history.

(56) References Cited

U.S. PATENT DOCUMENTS

| | | | | |
|---|---|---|---|---|
| 5,759,278 A * | 6/1998 | Tomono | B41J 29/377 118/712 |
| 2008/0069593 A1* | 3/2008 | Nishiyama | G03G 15/0121 399/227 |
| 2009/0246396 A1* | 10/2009 | Nakazawa | B05C 1/0813 427/428.18 |
| 2012/0229580 A1 | 9/2012 | Ohba | |
| 2013/0106946 A1 | 5/2013 | Sunaoshi | |
| 2014/0253652 A1* | 9/2014 | Ohba | B41J 11/0015 347/101 |
| 2016/0059586 A1* | 3/2016 | Numata | B41J 11/0015 347/21 |

(Continued)

FOREIGN PATENT DOCUMENTS

| | | |
|---|---|---|
| JP | 2008-096557 | 4/2008 |
| JP | 2008-253866 | 10/2008 |

(Continued)

*Primary Examiner* — John Zimmermann

(74) *Attorney, Agent, or Firm* — Harness, Dickey & Pierce, P.L.C.

(57) ABSTRACT

A coating apparatus includes a coating member, a pressing member, an abutment member, and a restriction member. The coating member coats a sheet with a coating agent. The pressing member is movable and abuts on the coating member to form a nip. The abutment member abuts on the coating member at a position different from a position of the nip. The restriction member restricts movement of the coating member in a separation direction in which the coating member separates from the abutment member.

11 Claims, 7 Drawing Sheets

(56) References Cited

U.S. PATENT DOCUMENTS

2019/0263148 A1* 8/2019 Chike ..................... B05C 1/025
2019/0270319 A1 9/2019 Ebihara
2020/0324548 A1* 10/2020 Achi .................... B41J 11/0015

FOREIGN PATENT DOCUMENTS

| | | |
|---|---|---|
| JP | 2011-183336 | 9/2011 |
| JP | 2012-196955 | 10/2012 |
| JP | 2013-091260 | 5/2013 |
| JP | 2019-150758 | 9/2019 |

* cited by examiner

COATING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2020-131660, filed on Aug. 3, 2020, in the Japan Patent Office, the entire disclosure of which is hereby incorporated by reference herein.

BACKGROUND

Technical Field

Embodiments of the present disclosure relate to a coating apparatus that coats sheets, such as sheets of paper, with a coating agent, such as a coating liquid, and an image forming system that includes the coating apparatus.

Discussion of the Background Art

An image forming system that includes an image forming apparatus, such as an inkjet printer, and a coating apparatus that coats sheets, such as paper, with a coating liquid has been known.

For example, a coating apparatus is disposed upstream from an image forming apparatus (inkjet printer), and coats a surface of a sheet (recording medium) conveyed to the inkjet printer with a coating liquid (processing agent liquid), such as a blurred-image controlling agent. A coating roller is urged toward a pressing roller by means of an elastic body, such as a spring, for the purpose of performing thin-film coating by means of a small-diameter coating roller.

SUMMARY

According to an embodiment of the present disclosure, a coating apparatus includes a coating member, a pressing member, an abutment member, and a restriction member. The coating member coats a sheet with a coating agent. The pressing member is movable and abuts on the coating member to form a nip. The abutment member abuts on the coating member at a position different from a position of the nip. The restriction member restricts movement of the coating member in a separation direction in which the coating member separates from the abutment member.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
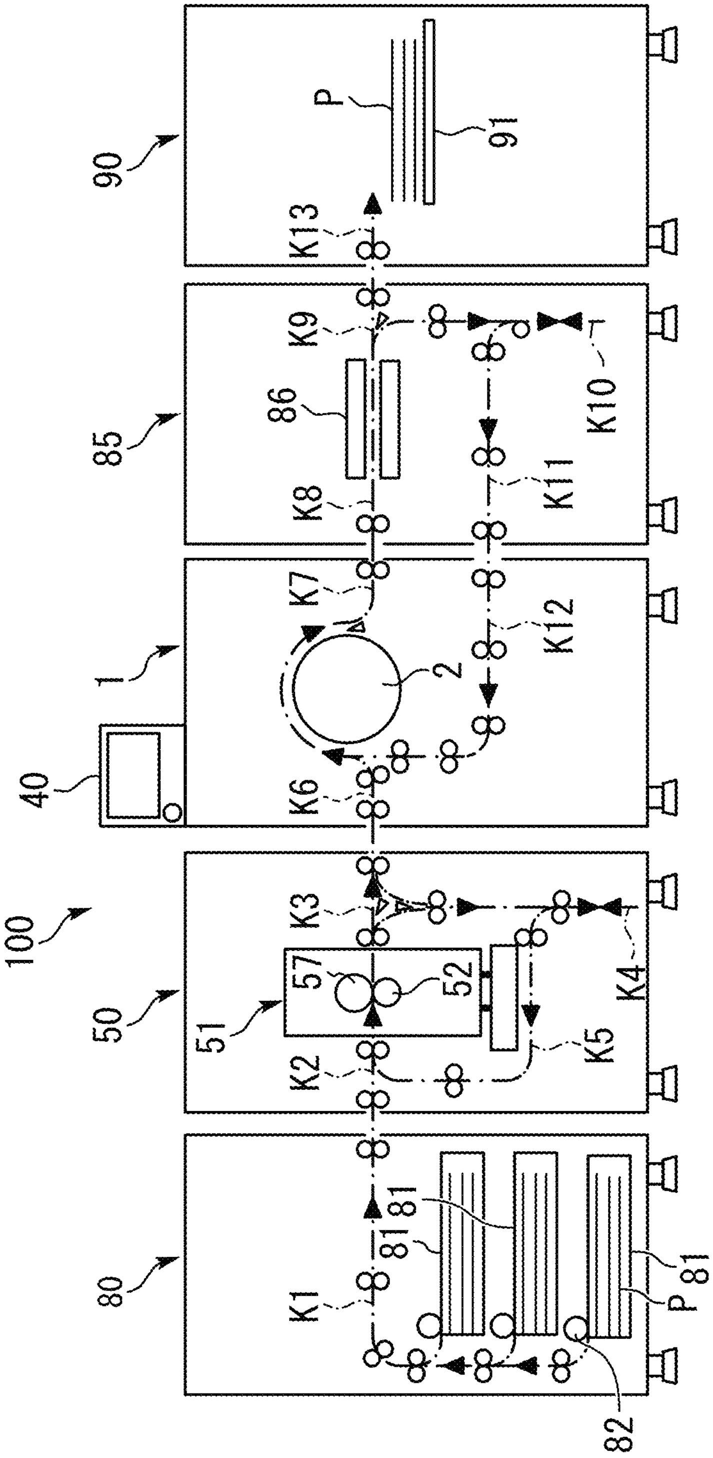
FIG. 1 is a general view illustrating an image forming system according to an embodiment of present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of the present disclosure will be described in detail with reference to the drawings. Note that identical or corresponding parts are given identical reference numerals in each of the drawings, and redundant descriptions of the identical or corresponding parts are summarized or omitted accordingly.

First, a whole configuration and operation of an image forming system 100 will be described with reference to FIG. 1. FIG. 1 illustrates an inkjet printer 1 as an image forming apparatus, a coating apparatus 50 that coats a sheet P conveyed to the image forming apparatus 1 with a coating liquid (coating agent), as a preliminary process, a sheet feeding apparatus 80 that feeds sheets P, such as paper, a drying apparatus 85 that dries ink on a sheet P after image formation, and a sheet ejection apparatus 90 in which sheets P discharged from the drying apparatus 85 are stacked. As illustrated in FIG. 1, in the image forming system 100 according to the present embodiment, from the upstream side, the sheet feeding apparatus 80, the coating apparatus 50, the image forming apparatus 1, the drying apparatus 85, and the sheet ejection apparatus 90 are connected.

Operation of the image forming system 100 will be briefly described with reference to FIG. 1. First, if a printing command and image information are input into a controller of the image forming system 100 from a personal computer or the like, a sheet feeding roller 82 feeds a sheet P from a sheet feeding cassette 81. The sheet P fed from the sheet feeding cassette 81 is conveyed to the coating apparatus 50 through a first conveyance path K1 by conveyance rollers. In the present embodiment, the sheet feeding apparatus 80 feeds cut paper accommodated in the sheet feeding cassette 81. However, the sheet feeding apparatus 80 may feed roll paper.

Then the sheet P fed to the coating apparatus 50 is conveyed to a coating-apparatus main portion 51 through a second conveyance path K2. Then in the coating-apparatus main portion 51, a bottom surface of the sheet P (a sheet surface that becomes a front surface when an image is formed) is coated with a coating liquid (preliminary-process liquid). The coating liquid (preliminary-process liquid) controls a blurred image, image show through, and the like. Then the sheet P coated with the coating liquid is conveyed to a reversing path K4 (fourth conveyance path), and is conveyed to the image forming apparatus 1 through a third conveyance path K3, with the conveyance direction reversed and the sheet P reversed (with a sheet surface coated with the coating liquid being a front surface (top surface). Here, if a mode for forming images on both surfaces of the sheet P (duplex-printing mode) is selected in the image forming apparatus 1, both surfaces of the sheet P need to be coated with the coating liquid. Therefore, the sheet P one surface of which has been coated with the coating liquid is conveyed to the reversing path K4, and the conveyance direction is reversed and the sheet P is reversed. Then the sheet P is conveyed to a duplex-printing path K5 (fifth conveyance path), and is conveyed to the coating-apparatus main portion 51 again. Then the sheet P the other surface of which has been coated by the coating-apparatus main portion 51 with the coating liquid is conveyed to the image forming apparatus 1 through the third conveyance path K3. A configuration and operation of the coating-apparatus main portion 51 in the coating apparatus 50 will be described in detail below with reference to FIGS. 3A and 3B, 4A to 4C, and the like.

Then the sheet P conveyed to the image forming apparatus 1 passes through a sixth conveyance path K6. Then a desired image is formed on a front surface (top surface) of the sheet P while the sheet P is conveyed by a conveyance drum 2. At this time, since the front surface of the sheet P is coated with the coating liquid, as a preliminary process, a blurred image, image show through, and the like are controlled. Then the sheet P on which the image has been formed is conveyed to the drying apparatus 85 through a seventh conveyance path K7. A configuration and operation of the image forming apparatus 1 will be described in detail below with reference to FIG. 2.

Then the sheet P conveyed to the drying apparatus 85 passes through an eighth conveyance path K8. Then the sheet P is conveyed to a dryer 86, and the image on the sheet P is dried. Then the sheet P the image on which has been dried is conveyed to the sheet ejection apparatus 90 through a ninth conveyance path K9. Here, if the above duplex-printing mode is selected, images need to be formed on both surfaces of the sheet P. Therefore, the sheet P on one surface of which the image has been dried is conveyed to a reversing path K10 (tenth conveyance path), and the conveyance direction is reversed and the sheet P is reversed. Then the sheet P is conveyed to duplex-printing paths K11 and K12 (eleventh and twelfth conveyance paths), and is conveyed to the conveyance drum 2 of the image forming apparatus 1 again. Then the sheet P on the other surface of which a desired image has been formed on the conveyance drum 2 is conveyed to the drying apparatus 85 through the seventh conveyance path K7 again. Then the sheet P the image on the other surface of which has been dried by the dryer 86 is conveyed to the sheet ejection apparatus 90 through the ninth conveyance path K9.

Then the sheet P conveyed to the sheet ejection apparatus 90 passes through a thirteenth conveyance path K13, and then is stacked on a sheet ejection tray 91. Consequently, a series of operation of the image forming system 100 is completed.

Figure 2:
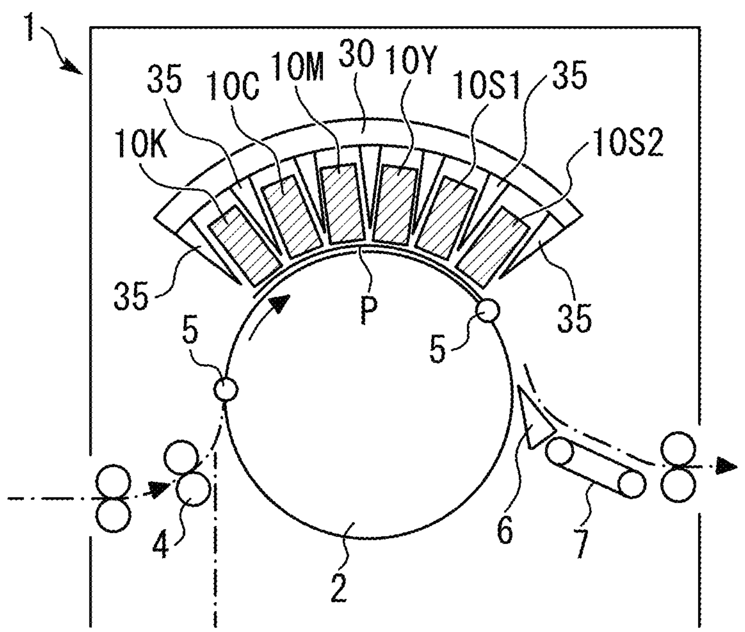
FIG. 2 is a configuration view illustrating a main part of an image forming apparatus.

Hereinafter, the image forming apparatus 1 (inkjet printer) will be described in detail with reference to FIG. 2. FIG. 2 illustrates the conveyance drum 2 that conveys a sheet P, a clip 5 that grips the sheet P on the conveyance drum 2, a separation member 6 that separates the sheet P from the conveyance drum 2, and a conveyance belt 7 that conveys the sheet P separated from the conveyance drum 2. FIG. 2 illustrates heads 10Y, 10M, 10C, 10K, 10S1, and 10S2 that are unitized image forming portions that use an inkjet system to print letters and images (letter printing module), and a base frame 30 that holds beams 35 and the like.

The image forming apparatus 1 according to the present embodiment is to form color images. As illustrated in FIG. 2, the image forming apparatus 1 according to the present embodiment includes the head 10K for black, the heads 10Y, 10M, and 10C of three colors (yellow, magenta, and cyan) for colors, and the heads 10S1 and 10S2 of two colors for coating (for special colors). The six heads 10Y, 10M, 10C, 10K, 10S1, and 10S2 are opposite the conveyance drum 2, with a minute gap between the six heads 10Y, 10M, 10C, 10K, 10S1, and 10S2 and the conveyance drum 2. The six heads 10Y, 10M, 10C, 10K, 10S1, and 10S2 are radially aligned along a rotation direction of the conveyance drum 2. The six heads 10Y, 10M, 10C, 10K, 1051, and 10S2 have almost the same structure except different ink colors (types) used for printing. The heads 10Y, 10M, 10C, 10K, 10S1, and 10S2 are substantially cuboid-shaped units. The substantially cuboid-shaped unit includes a main part that includes a piezoelectric actuator. The substantially cuboid-shaped unit includes nozzles that eject an ink as a liquid (liquid droplets), an ink tank filled with the ink, a control circuit board (controller), and the like.

Operation of the image forming apparatus 1 will be briefly described with reference to FIG. 2. First, a sheet P is conveyed to the image forming apparatus 1, and the sheet P is conveyed to the conveyance drum 2 by a conveyance roller 4. On the other hand, in the heads 10Y, 10M, 10C, 10K, 10S1, and 10S2 of each color, input image information is transformed into writing information about each color. Then the sheet P conveyed to the conveyance drum 2 is positioned on the conveyance drum 2, with the sheet P gripped by the clip 5, and is conveyed along rotation of the conveyance drum 2 in a counterclockwise direction. The heads 10Y, 10M, 10C, 10K, 10S1, and 10S2 of each color sequentially jet inks as liquids onto the sheet P conveyed in an arrow direction in FIG. 2 by rotation of the conveyance drum 2, on the basis of the writing information, to form a desired image on the sheet P. Then the sheet P on which the desired image has been formed is separated from the conveyance drum 2 by the separation member 6. Then the sheet P separated from the conveyance drum 2 is conveyed by the conveyance belt 7, and further is conveyed to the drying apparatus 85 by conveyance rollers.

Figure 3A:
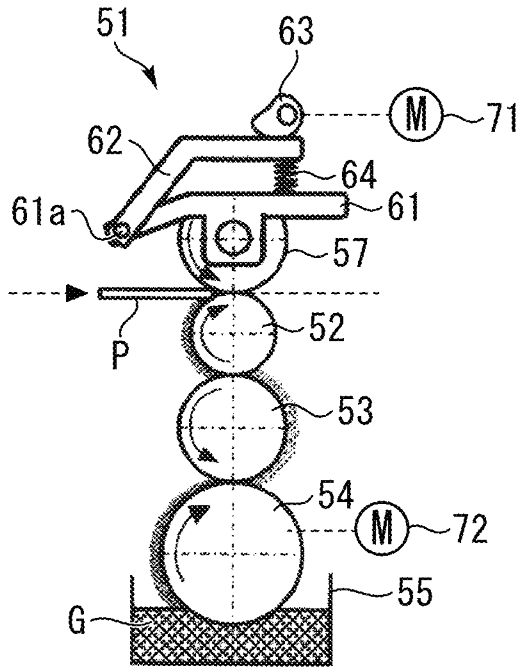
FIGS. 3A and 3B are drawings illustrating operation of a main part of a coating apparatus.
Figure 3B:
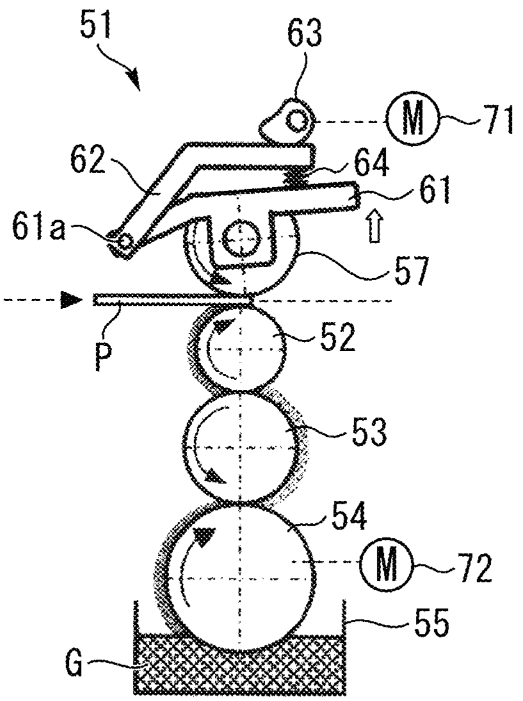
Figure 4A:
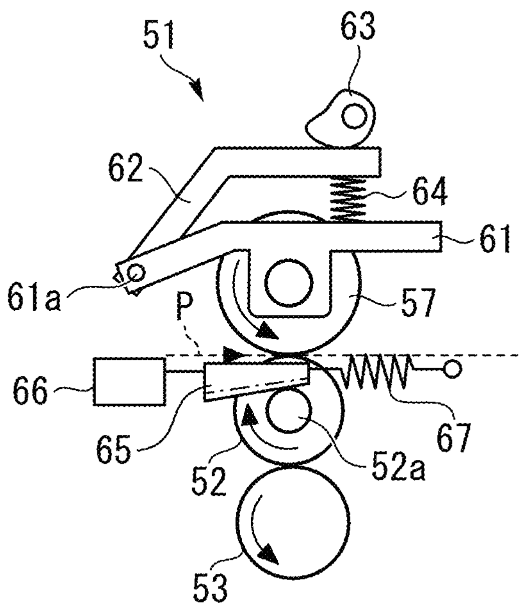
FIGS. 4A, 4B, and 4C are drawings illustrating operation of a restriction member in the coating apparatus.
Figure 4B:
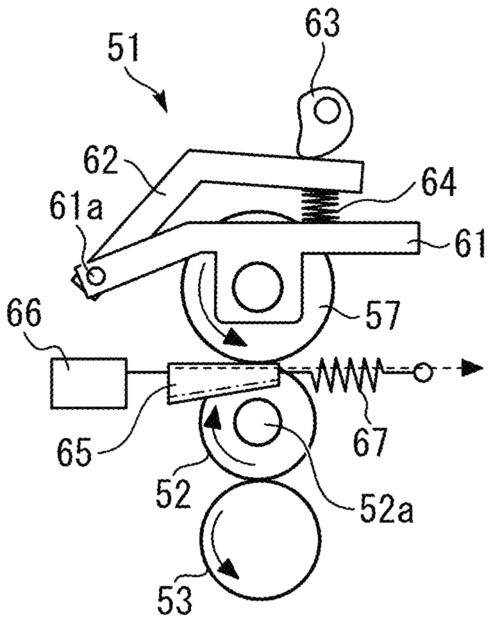
Figure 4C:
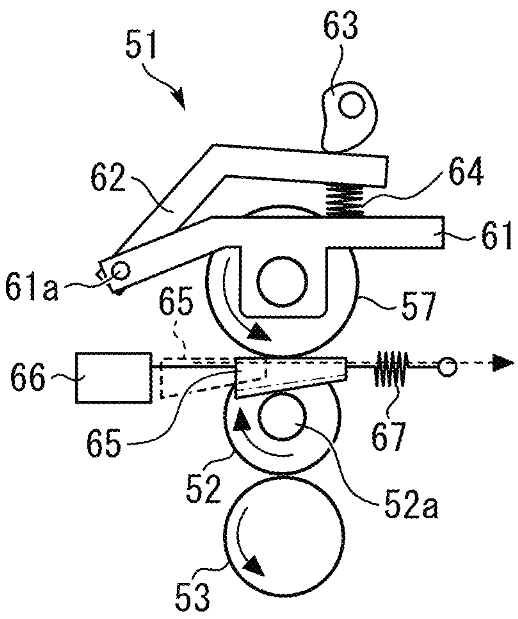

Hereinafter, the coating apparatus 50 characteristic of the image forming system 100 according to the present embodiment will be described in detail with reference to FIGS. 3A and 3B, 4A to 4C, and the like. The coating apparatus 50 is an apparatus that coats a sheet P, such as paper, with a coating liquid G as a coating agent. As illustrated in FIGS. 3A and 3B, the coating apparatus 50 (coating-apparatus main portion 51) according to the present embodiment includes a coating roller 52 as a coating member, an intermediate roller 53 as an abutment member, a drawing roller 54, a pressing roller 57 as a pressing member, a storage unit 55, a pressing mechanism including, for example, a first pressing arm 61, a second pressing arm 62, a cam 63, a compressed spring 64. As illustrated in FIGS. 4A to 4C, the coating apparatus 50 (coating-apparatus main portion 51) according to the present embodiment also includes a stopper 65 (wedge-shaped member) as a restriction member, a solenoid 66 as a movement mechanism (movement unit), and a tension spring 67 as an urging body (urging unit). For the sake of simplicity, the stopper 65, the solenoid 66, and the tension spring 67 are not illustrated in FIGS. 3A and 3B, and the drawing roller 54 and the storage unit 55 are not illustrated in FIGS. 4A to 4C.

Figure 5A:
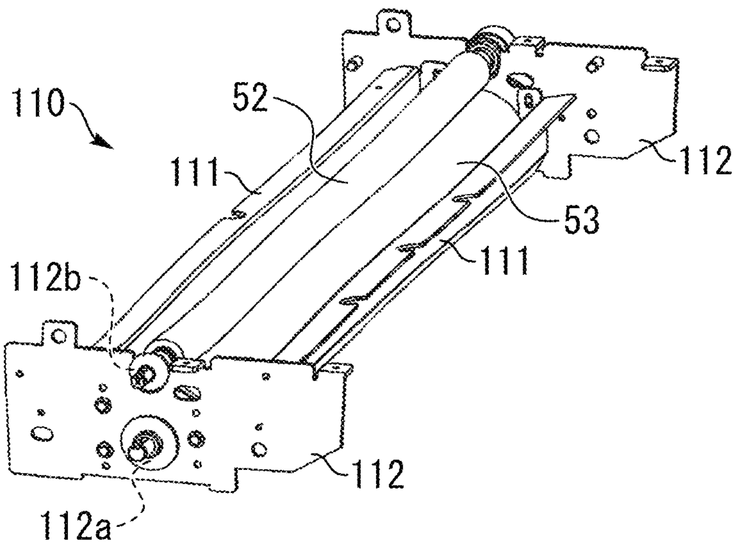
FIG. 5A is a perspective view illustrating an internal structure of a main part of the coating apparatus.

The coating roller 52 as a coating member is a roller member that coats a sheet P with the coating liquid G as a coating agent. The coating roller 52 as a coating member is disposed in such a manner that the coating roller 52 as a coating member extends in a lengthwise direction (that is a sheet-surface perpendicular direction in FIGS. 3A and 3B, and is a rotation axis direction). The coating roller 52 is held in a main-body housing (is held in the main-body housing by a subunit 110 illustrated in FIG. 5A) in such a manner that the coating roller 52 can move in upward and downward directions in FIGS. 3A and 3B and can rotate in arrow directions in FIGS. 3A and 3B. The pressing roller 57 as a pressing member is a movable roller member. A nip (coating nip) is formed in the lengthwise direction between the pressing roller 57 and the coating roller 52. The pressing roller 57 is held in the main-body housing (is held in the main-body housing by a first pressing arm 61 illustrated in FIGS. 3A and 3B) in such a manner that the pressing roller 57 can move in upward and downward directions in FIGS. 3A and 3B and can rotate in arrow directions in FIGS. 3A and 3B. The intermediate roller 53 as an abutment member is a roller member that abuts on the coating roller 52 and the drawing roller 54. The intermediate roller 53 as an abutment member abuts on the coating roller 52 at a position different from a position of the nip (coating nip) between the coating roller 52 and the pressing roller 57. The intermediate roller 53 is held in the main-body housing (is held in the main-body housing by the subunit 110 illustrated in FIG. 5A) in such a manner that the intermediate roller 53 can rotate in arrow directions in FIGS. 3A and 3B. The intermediate roller 53 also functions as a secured member that does not move in upward and downward directions and is disposed at a secured position in FIGS. 3A and 3B. The storage unit 55 stores a fixed amount of the coating liquid G. The storage unit 55 is a box-shaped member of a substantially cuboid shape whose lengthwise direction is a sheet-surface perpendicular direction in FIGS. 3A and 3B. The drawing roller 54 functions as a drawing member that draws the coating liquid G stored in the storage unit 55. The drawing roller 54 is held in the main-body housing (the main-body housing in which the subunit 110 illustrated in FIG. 5A is detachably disposed) in such a manner that the drawing roller 54 can rotate in arrow directions in FIGS. 3A and 3B. The drawing roller 54 does not move in upward and downward directions and is disposed at a secured position in FIGS. 3A and 3B.

In the coating apparatus 50 configured in this way, the drawing roller 54 carries the coating liquid G in the storage unit 55 while rotating in a clockwise direction in FIGS. 3A and 3B. The coating liquid G carried by the drawing roller 54 transfers to and is carried by the intermediate roller 53 (weighing roller) that rotates in a counterclockwise direction in FIGS. 3A and 3B. The coating liquid G carried by the intermediate roller 53 is made to be an appropriate amount (weighed) at a position where the intermediate roller 53 abuts on the coating roller 52 that rotates in a clockwise direction in FIGS. 3A and 3B. The appropriate amount of the coating liquid G is carried by the coating roller 52. Then a sheet surface (bottom surface) of a sheet P conveyed to the nip between the coating roller 52 and the pressing roller 57 is coated with the coating liquid G carried by the coating roller 52 (coating process). At this time, the pressing roller 57 rotates in a counterclockwise direction in FIGS. 3A and 3B while being pressed by the pressing mechanism including, for example, the first pressing arm 61, the second pressing arm 62, the cam 63, the compressed spring 64.

The drawing roller 54 is coupled to a driving motor 72. The driving motor 72 controlled by the controller drives and rotates the drawing roller 54 in a predetermined direction. Driving is transmitted to the intermediate roller 53 and the coating roller 52 from the driving motor 72 through a gear train to rotate the intermediate roller 53 and the coating roller 52 in respective predetermined directions. A gear that can abut on and separate from the above gear train is disposed at a shaft end of the pressing roller 57 so that driving of the driving motor 72 is transmitted to the pressing roller 57 to rotate the pressing roller 57.

The pressing roller 57 can be moved in abutment and separation directions (upward and downward directions) relative to the coating roller 52 by the pressing mechanism including, for example, the first pressing arm 61, the second pressing arm 62, the cam 63, the compressed spring 64. As illustrated in FIGS. 3A and 3B, the pressing mechanism includes, for example, the first pressing arm 61, the second pressing arm 62, the cam 63, the compressed spring 64, and the like. The first pressing arm 61 is held in the main-body housing in such a manner that the first pressing arm 61 can rotate on a support shaft 61*a*. The first pressing arm 61 holds the pressing roller 57 rotatably. The second pressing arm 62 is held in the main-body housing in such a manner that the second pressing arm 62 can rotate on the support shaft 61*a* of the first pressing arm 61, separately from rotation of the first pressing arm 61. The compressed spring 64 is disposed on the second pressing arm 62. The compressed spring 64 forces the first pressing arm 61 and the pressing roller 57 to the coating roller 52. One end side of the compressed spring 64 is coupled to the first pressing arm 61. The other end side of the compressed spring 64 is coupled to the second pressing arm 62. The cam 63 has a cam surface that abuts on a top surface of the second pressing arm 62. The cam 63 is driven and rotated by a cam motor 71, and thus changes a cam angle to move the first pressing arm 61, the second pressing arm 62, and the pressing roller 57 upward and downward. When a coating process is performed, the pressing mechanism including, for example, the first pressing arm 61, the second pressing arm 62, the cam 63, the compressed spring 64 moves the pressing roller 57 to an abutment position (position where the pressing roller 57 abuts on the coating roller 52) illustrated in FIG. 3A. On the other hand, when a coating process is not performed, the pressing mechanism including, for example, the first pressing arm 61, the second pressing arm 62, the cam 63, the compressed spring 64 move the pressing roller 57 to a separation position (position where the pressing roller 57 separates from the coating roller 52).

As illustrated in FIGS. 4A to 4C, the coating apparatus 50 according to the present embodiment includes the stopper 65 (wedge-shaped member) as a restriction member that restricts movement of the coating roller 52 relative to the intermediate roller 53 (abutment member) in a separation direction (upward in FIGS. 3A and 3B and 4A to 4C). That is to say, the stopper 65 functions as a restriction member that restricts movement of the coating roller 52 in the separation direction in which the coating roller 52 separates from the intermediate roller 53 (abutment member). More specifically, the stopper 65 (restriction member) abuts on a shaft 52*a* (or a bearing that holds the shaft 52*a* rotatably) of the coating roller 52 to restrict movement of the coating roller 52 in the separation direction (upward direction), as illustrated in FIG. 4A. That is to say, the coating roller 52 does not freely move in the separation direction (upward direction), but the coating roller 52 abutting on the stopper 65 restricts movement (movement amount) of the coating roller 52 (the movement becomes difficult).

Providing the stopper 65 (restriction member) in this way decreases phenomena in which just as a sheet P enters the nip between the coating roller 52 and the pressing roller 57, the pressing roller 57 jumps by at least the thickness of the sheet P, and the coating roller 52 also moves upward. Therefore, failures that an amount of the coating liquid G with which the coating roller 52 coats a sheet P varies (coating unevenness) are decreased.

Figure 7A:
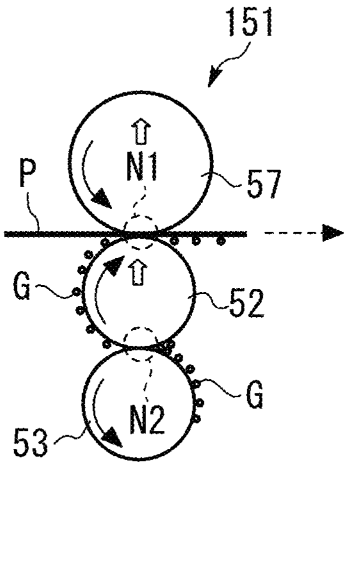
FIGS. 7A and 7B are drawings illustrating operation of a main part of a coating apparatus as a comparative example.
Figure 7B:
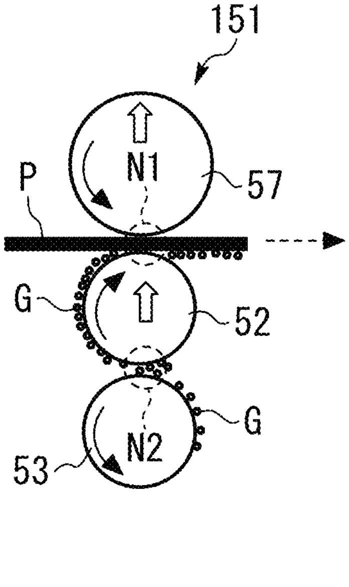

More specifically, in such a case where the stopper 65 (restriction member) is not disposed, as in a coating apparatus 151 illustrated in FIGS. 7A and 7B, just as a sheet P enters a nip between a coating roller 52 and a pressing roller 57, the pressing roller 57 jumps in a white-arrow direction by at least the thickness of the sheet P. Just as the pressing roller 57 jumps, pressure application to the coating roller 52 is weakened. The coating roller 52 (or an intermediate roller 53) also moves upward (in a white-arrow direction). A large amount of coating liquid G passes through a nip N2 between the coating roller 52 and the intermediate roller 53 (transfer of the coating liquid G becomes excessive). An amount of coating liquid G with which the coating roller 52 coats a sheet P at a position of a coating nip N1 varies (coating unevenness). In particular, in a case where a thick sheet P (thick paper) passes, as illustrated in FIG. 7B, such a failure becomes more remarkable than a case where a thin sheet P (thin paper) passes, as illustrated in FIG. 7A. In cases, such as a case where a conveyance speed of a sheet P is high, and a case where a roller diameter of the coating roller 52 is small, such a failure becomes more remarkable. To solve such a failure, a means of increasing the spring constant of the compressed spring 64 to increase a pressure application force of the pressing roller 57, and a means of securing the pressing roller 57 not to allow the pressing roller 57 to move upward and downward are conceivable. However, the former is likely to cause a conveyance failure due to a delay (conveyance timing delay) in a sheet P entering the nip (coating nip), and the latter is likely to cause a conveyance failure that a sheet P does not pass through the nip (coating nip).

On the contrary, in the present embodiment, movement of the coating roller 52 in the separation direction is allowed to some degree, and a movement amount of the coating roller 52 in the separation direction is restricted. Therefore, occurrence of such a failure described above is decreased. That is to say, coating unevenness (variation) of a coating liquid G with which a sheet P is coated is decreased without causing a conveyance failure of the sheet P. In the present embodiment, the stopper 65 (restriction member) that can directly abut on the coating roller 52 is provided. However, a stopper 65 (restriction member) that can indirectly abut on the coating roller 52 may be provided.

In the present embodiment, the stopper 65 as a restriction member is a wedge-shaped member that has an abutment surface (portion represented by an alternating long and short dash line) that slopes relative to a direction (horizontal direction) that perpendicularly crosses the separation direction, and the abutment surface can directly or indirectly abut on the coating roller 52, as illustrated in FIGS. 4A to 4C. That is to say, the stopper 65 is wedge-shaped, and the abutment surface that abuts on the coating roller 52 is not a horizontal surface but is a sloping surface that is at a small angle relative to a horizontal surface (a sloping surface that slopes upward from the left to the right in FIGS. 4A to 4C). The stopper 65 is held in the main-body housing by the subunit 110 illustrated in FIGS. 5A and 6 in such a manner that the stopper 65 can slide in a substantially horizontal direction (direction that perpendicularly crosses the separation direction) in FIGS. 4A to 4C. The stopper 65 (restriction member) is urged by the tension spring 67 as an urging body in a direction in which the abutment surface (sloping surface) of the stopper 65 (restriction member) abuts on the coating roller 52 (rightward in FIGS. 4A to 4C).

Due to such a configuration, the tension spring 67 forces the stopper 65 to make the stopper 65 always abut on the shaft 52*a* of the coating roller 52. Therefore, even if the cam 63 rotating from the state in FIG. 4A presses the pressing roller 57, the coating roller 52, and the intermediate roller 53, and thus the coating roller 52 goes down to an intermediate roller 53 side, and thus a gap is nearly formed between the stopper 65 and the coating roller 52 (the state in FIG. 4B), the stopper 65 slides rightward, as illustrated in FIG. 4C, since the stopper 65 is wedge-shaped. Therefore, an abutment state between the stopper 65 and the coating roller 52 is maintained. Note that even if an angle (an orientation in a rotation direction) of the cam 63 changes a pressure application force of the pressing roller 57 to the coating roller 52, and the coating roller 52 moves, the stopper 65 similarly operates and has a similar effect. Further, since the stopper 65 restricts movement of the coating roller 52 to a pressing roller 57 side, a nip between the coating roller 52 and the intermediate roller 53 is maintained even if pressure application by the pressing roller 57 is canceled. Therefore, an amount of coating liquid G supplied to the coating roller 52 from the intermediate roller 53 is stable.

Figure 5B:
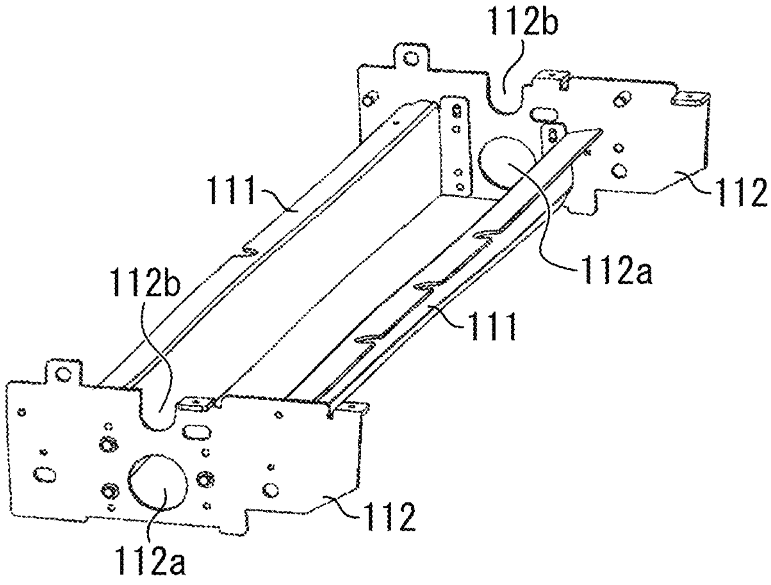
FIG. 5B is a perspective view illustrating a frame structure of the main part of the coating apparatus.

In the present embodiment, the stopper 65 (restriction member) can move between a restriction position where the stopper 65 restricts movement of the coating roller 52 (coating member) in the separation direction (a position represented with a solid line in FIG. 4C) and a restriction cancellation position where the stopper 65 does not restrict movement of the coating roller 52 in the separation direction (a position represented with a broken line in FIG. 4C). More specifically, the coating apparatus 50 includes the tension spring 67 as an urging body that urges the stopper 65 (restriction member) toward the restriction position, and the solenoid 66 as a movement mechanism that moves the stopper 65 to the restriction cancellation position against urging of the tension spring 67 (urging body). Even more specifically, one end side of the tension spring 67 is coupled to one end side of the stopper 65, and the other end side of the tension spring 67 is coupled to the main-body housing. The solenoid 66 includes a plunger coupled to the other end side of the stopper 65. The solenoid 66 is secured to and held by a side plate 112 of the subunit 110 illustrated in FIGS. 5A and 5B and 6.

Due to such a configuration, the solenoid 66 to which a voltage is not applied does not generate attraction of the plunger, and thus the tension spring 67 forces the stopper 65 rightward in FIGS. 4A to 4C to a position where the stopper 65 abuts on the shaft 52*a* of the coating roller 52 (restriction position). At this time, the stopper 65 functions as a restriction member that restricts movement of the coating roller 52 in the separation direction, as described above. On the other hand, the solenoid 66 to which a voltage is applied generates attraction of the plunger, and thus the stopper 65 moves leftward in FIGS. 4A to 4C to a position where the stopper 65 does not abut on the coating roller 52 (restriction cancellation position), against the urging of the tension spring 67. At this time, the stopper 65 does not function as a restriction member that restricts movement of the coating roller 52 in the separation direction, as described above. Such a state is useful when it is intended that a pressure of the coating roller 52 is released, such as a case where a coating process is not performed. More specifically, in the present embodiment, when the coating apparatus 50 does not perform a coating process, the pressing mechanism including, for example, the first pressing arm 61, the second pressing arm 62, the cam 63, the compressed spring 64 moves the pressing roller 57 to the separation position (position where the pressing roller 57 separates from the coating roller 52) after a voltage is applied to the solenoid 66 to move the stopper 65 to the restriction cancellation position. Performing such a control decreases failures that elastic deformation occurs in the pressing roller 57 and the coating roller 52, and the like, compared with a case where the pressing roller 57 and the coating roller 52 are always pressed against each other. Since the stopper 65 abuts on the shaft 52*a* of the coating roller 52, a configuration simpler than a configuration in which another member except the shaft 52*a* is provided and the stopper 65 is made to abut on the another member restricts movement of the coating roller 52 in the separation direction.

In the present embodiment, the solenoid 66 (movement unit) may be controlled so that the stopper 65 (restriction member) moves to the restriction position or the restriction cancellation position, according to the thickness of a sheet P that enters the nip (coating nip). More specifically, if the thickness of a sheet P is thin, movement of the coating roller 52 is small compared with a case where the thickness of a sheet P is thick, as described above with reference to FIGS. 7A and 7B, and there is not much necessity to restrict movement of the coating roller 52 in the separation direction with the stopper 65. Therefore, if the thickness of a sheet P is thin, a voltage is applied to the solenoid 66 to move the stopper 65 to the restriction cancellation position. If the thickness of a sheet P is thick, a voltage is not applied to the solenoid 66 to move the stopper 65 to the restriction position. Therefore, a frequency of damages caused by abutment between the stopper 65 and the coating roller 52 is decreased. When such a control is performed, a sheet thickness detection sensor, such as a range sensor, disposed in a sheet conveyance path upstream from the nip may be used as a detection unit that directly detects the thickness of a sheet P that enters the nip. Alternatively, an operation display panel 40 (see FIG. 1) disposed at the exterior of the image forming system 100, as a detection unit that indirectly detects the thickness of a sheet P that enters the nip, may be used to indirectly detect the thickness of a sheet P from information regarding the sheet P input into the operation display panel 40 by a user. If the thickness of a sheet P detected by the detection unit is equal to or smaller than a predetermined value, a voltage is applied to the solenoid 66.

Figure 6:
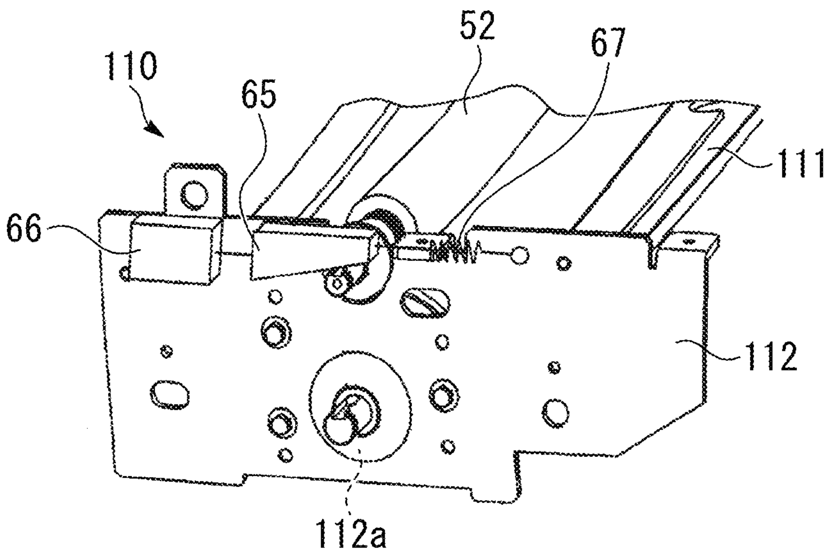
FIG. 6 is a perspective view illustrating the vicinity of a stopper.

The subunit 110 illustrated in FIGS. 5A and 6 is detachably disposed in the coating-apparatus main portion 51 (coating apparatus 50) according to the present embodiment. The subunit 110 holds the coating roller 52 and the intermediate roller 53 rotatably. The subunit 110 is detachably disposed in the main-body housing (main unit) that holds the drawing roller 54 and the like rotatably. More specifically, the subunit 110 includes a housing that includes two side plates 112, and a stay 111 disposed between the two side plates 112. The two side plates 112 each have a positioning hole 112*a*, and a cut portion 112*b* that is U-shaped (a side opposite the pressing roller 57 is cut). In the subunit 110, the intermediate roller 53 is rotatably held by bearings in the positioning holes 112*a* of the two side plates 112. In the subunit 110, the coating roller 52 is held by bearings in the cut portions 112*b* of the two side plates 112 in such a manner that the coating roller 52 can rotate and can move up and down.

In this way, part of the coating-apparatus main portion 51 (coating apparatus 50) is unitized into a subunit. Therefore, easiness in maintaining and replacing the coating roller 52, the intermediate roller 53, and the like is improved. Further, in the present embodiment, the coating roller 52 that has a relatively small outer diameter and allows self-stripping is used to improve easiness in separating a thin sheet P (thin paper) at the coating nip. The coating roller 52 that has such a small diameter can move in load directions (upward and downward directions) to make the coating roller 52 less likely to bend. In particular, even if the subunit 110 is stored as a service part for a long time, a large abutment pressure between the coating roller 52 and the intermediate roller 53 is not applied to the coating roller 52. Therefore, the coating roller 52 is less likely to bend (an elastic warp is less likely to occur). Further, in the present embodiment, the intermediate roller 53 as a secured member is preferably held (positioned) in the positioning holes 112*a* without plays. However, if no play is set for the positioning holes 112*a*, it is difficult to attach and detach the intermediate roller 53 to and from the subunit 110. Therefore, the intermediate roller 53 as a secured member may be held in the positioning holes 112*a*, with slight plays, within a range within which the functions of the intermediate roller 53 described above are satisfied (a range within which a large variation in a coating amount, and the like do not occur). In the present description and the like, the intermediate roller 53 is defined as the intermediate roller 53 functioning as a secured member even if there are plays in this way.

Referring to FIG. 6, in the present embodiment, the stopper 65, the solenoid 66, and the tension spring 67 are detachably (replaceably) disposed on each of the two side plates 112 of the subunit 110 (are not illustrated in FIG. 5A). Therefore, easiness in maintaining and replacing the stopper 65, the solenoid 66, and the tension spring 67 is also improved.

MODIFICATION EXAMPLE

Figure 8A:
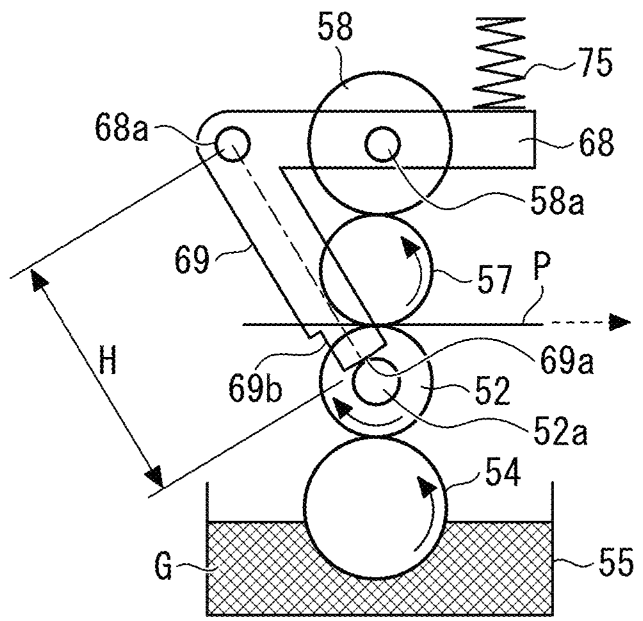
FIGS. 8A and 8B are drawing s illustrating operation of a main part of a coating apparatus as a modification example.
Figure 8B:
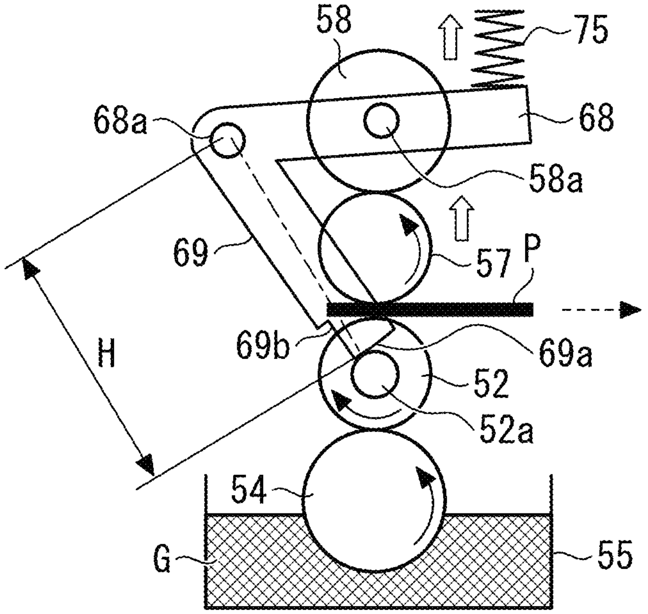

As illustrated in FIGS. 8A and 8B, a coating apparatus 50 (coating-apparatus main portion 51) according to a modification example includes a coating roller 52 as a coating member, a drawing roller 54 as an abutment member, a pressing roller 57 as a pressing member, a storage unit 55, a pressing mechanism including, for example, a pressing roller 58, a pressing arm 68, and a compressed spring 75. In this way, the coating apparatus 50 according to the modification example does not include the intermediate roller 53, unlike the coating apparatus 50 in FIGS. 3A and 3B. A coating liquid G (coating agent) is directly supplied to the coating roller 52 from the drawing roller 54. That is to say, in the modification example, the drawing roller 54 functions as an abutment member that abuts on the coating roller 52 at a position different from a position of a nip (coating nip) where the coating roller 52 abuts on the pressing roller 57. The drawing roller 54 functions as a secured member that does not move in upward and downward directions and is disposed at a secured position in FIGS. 8A and 8B.

The pressing mechanism according to the modification example includes the pressing roller 58, the pressing arm 68 as an urging member, the compressed spring 75, and the like, as illustrated in FIGS. 8A and 8B. The pressing roller 58 is a roller member that presses the pressing roller 57 from above to apply a pressure application force of the pressing roller 57 to the coating roller 52. The pressing arm 68 is held in a main-body housing in such a manner that the pressing arm 68 can rotate on a rotation shaft 68*a* (rotation center). One end side of the compressed spring 75 is coupled to an end of the pressing arm 68. Between the end of the pressing arm 68 and the rotation shaft 68*a*, the pressing arm 68 holds the pressing roller 58 rotatably. The other end side of the compressed spring 75 is coupled to the main-body housing. Due to such a configuration, the pressing mechanism including, for example, the pressing roller 58, the pressing arm 68 as an urging member, and the compressed spring 75 presses the pressing roller 57 against the coating roller 52. Therefore, it can be also said that the pressing arm 68 functions as an urging member that urges the pressing roller 57 (pressing member) toward the coating roller 52 (coating member). The pressing mechanism including, for example, the pressing roller 58, the pressing arm 68 as an urging member, and the compressed spring 75 according to the modification example is preferably driven and rotated by a driving unit, such as a motor, like the pressing mechanism including, for example, the first pressing arm 61, the second pressing arm 62, the cam 63, the compressed spring 64 in FIGS. 3A and 3B. As a specific example, a motor may be directly coupled to the rotation shaft 68*a*, or a cam may be made to abut on the pressing arm 68. The pressing mechanism including, for example, the pressing roller 58, the pressing arm 68 as an urging member, and the compressed spring 75 can be driven by a driving unit in this way so that a control that adjusts a pressure application force of the pressing roller 57 according to the thickness of a sheet P that enters the nip, a control that releases a pressure of the pressing roller 57 at a no-coating process, and the like can be performed like the pressing mechanism including, for example, the first pressing arm 61, the second pressing arm 62, the cam 63, the compressed spring 64 in FIGS. 3A and 3B.

As illustrated in FIGS. 8A and 8B, the pressing arm 68 as an urging member according to the modification example supports a stopper portion 69 (arm-shaped stopper portion). The stopper portion 69 (arm-shaped stopper portion) is a restriction member that restricts movement of the coating roller 52 (coating member) in a separation direction relative to the drawing roller 54 (abutment member). That is to say, the stopper portion 69 functions as a restriction member that restricts movement of the coating roller 52 in the separation direction in which the coating roller 52 separates from the drawing roller 54 (abutment member). More specifically, in the modification example, the stopper portion 69 and the pressing arm 68 are integrally formed. The stopper portion 69 is arm-shaped in such a manner that the stopper portion 69 extends from the rotation shaft 68*a* to the coating roller 52. The stopper portion 69 (restriction member) of the pressing arm 68 abuts on a shaft 52*a* (or a bearing that holds the shaft 52*a* rotatably) of the coating roller 52 to restrict movement of the coating roller 52 in the separation direction (upward direction). That is to say, the coating roller 52 does not freely move in the separation direction (upward direction), but the coating roller 52 abutting on the stopper portion 69 restricts movement (movement amount) of the coating roller 52 (the movement becomes difficult). Providing the stopper portion 69 (restriction member) in this way decreases phenomena in which just as a sheet P enters the nip between the coating roller 52 and the pressing roller 57, the pressing roller 57 jumps by at least the thickness of the sheet P, and the coating roller 52 also moves upward. Therefore, also in the modification example, failures that an amount of coating liquid G with which the coating roller 52 coats a sheet P varies (coating unevenness) are decreased. In the modification example, the stopper portion 69 as a restriction member and the pressing arm 68 as an urging member are integrally formed as the same component. However, a stopper portion 69 as a restriction member and a pressing arm 68 as an urging member may be separate components, and may be joined together by bolting or the like.

In the modification example, the orientation of the pressing arm 68 (urging member) changes according to the thickness of a sheet P that enters the nip (coating nip). More specifically, if a thick sheet P enters the nip, as illustrated in FIG. 8B, the sheet P pushes up the pressing roller 57 larger than a case where a thin sheet P enters the nip, as illustrated in FIG. 8A, and the pressing arm 68 rotates on the rotation shaft 68*a* in a counterclockwise direction in FIGS. 8A and 8B. At this time, even if the orientation of the stopper portion 69 (restriction member) changes according to the change in the orientation of the pressing arm 68 (urging member), the stopper portion 69 directly or indirectly abuts on the coating roller 52 (coating member) so that the coating roller 52 does not move in the separation direction. More specifically, even if the stopper portion 69 and the pressing arm 68 rotate on the rotation shaft 68*a*, as illustrated from FIG. 8A to FIG. 8B, the stopper portion 69 abuts on the shaft 52*a* of the coating roller 52, and restricts upward movement of the coating roller 52. Even more specifically, when the stopper portion 69 (restriction member) is seen in a cross section that perpendicularly crosses the rotation shaft 68*a*, as illustrated in FIGS. 8A and 8B, a distance H from an abutment surface 69*a* of the stopper portion 69 (restriction member) that directly or indirectly abuts on the coating roller 52 to the rotation shaft 68*a* is substantially uniform even if the stopper portion 69 (restriction member) and the pressing arm 68 rotate on the rotation shaft 68*a*. More specifically, when the stopper portion 69 (restriction member) is seen in a cross section that perpendicularly crosses the rotation shaft 68*a*, the abutment surface 69*a* that directly or indirectly abuts on the coating roller 52 is substantially arc-shaped so that the distance H from the rotation shaft 68*a* to the abutment surface 69*a* is substantially uniform. Such a configuration allows the stopper portion 69 to restrict upward movement of the coating roller 52 without a change in an absolute restriction position even if the stopper portion 69 and the pressing arm 68 rotate on the rotation shaft 68*a*.

Figure 9:
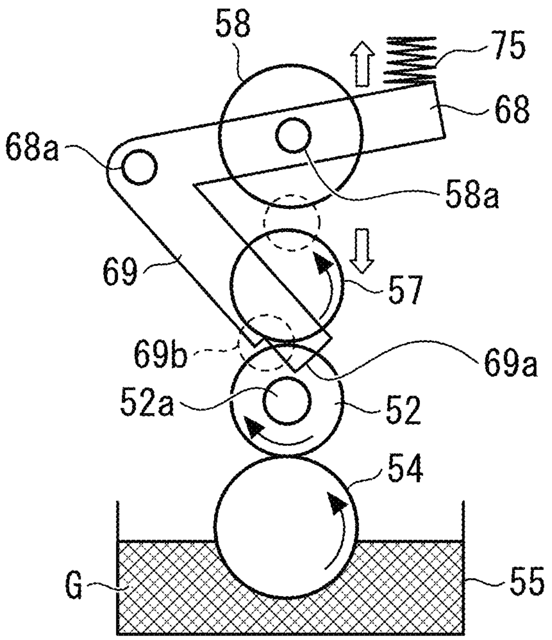
FIG. 9 is a drawing illustrating a state of the coating apparatus in FIGS. 8A and 8B in which restriction by a restriction member to a coating roller is cancelled.

In the modification example, the stopper portion 69 (restriction member) has the abutment surface 69*a* that directly or indirectly abuts on the coating roller 52 (coating member) to restrict movement of the coating roller 52 in the separation direction, and a cut portion 69*b* cut from the abutment surface 69*a* so that the cut portion 69*b* does not directly or indirectly abut on the coating roller 52 and does not restrict movement of the coating roller 52 in the separation direction. More specifically, the cut portion 69*b* is upstream from the abutment surface 69*a* in a pressure release rotation direction of the pressing arm 68 (rotation direction in a counterclockwise direction). As illustrated in FIG. 9, a distance from the rotation shaft 68*a* to the cut portion 69*b* is shorter than the distance H (see FIGS. 8A and 8B) from the rotation shaft 68*a* to the abutment surface 69*a* so that the cut portion 69*b* does not abut on the shaft 52*a* of the coating roller 52 even if the cut portion 69*b* is opposite the shaft 52*a*. Therefore, when the cut portion 69*b* is opposite the shaft 52*a* of the coating roller 52 (when the cut portion 69*b* is between the rotation shaft 68*a* and the shaft 52*a*), as illustrated in FIG. 9, the stopper portion 69 does not function as a restriction member. Such a state is useful when it is intended that a pressure of the coating roller 52 is released, such as a case where a coating process is not performed. More specifically, in the modification example, when the coating apparatus 50 does not perform a coating process, the driving unit described above rotates the pressing arm 68 to the position in FIG. 9, and pressures of the pressing roller 57 and the coating roller 52 are released. Performing such a control decreases failures that elastic deformation occurs in the pressing roller 57 and the coating roller 52, and the like, compared with a case where the pressing roller 57 and the coating roller 52 are always pressed against each other.

As described above, the coating apparatus 50 (image forming system 100) according to the present embodiment includes the coating roller 52 (coating member) that coats a sheet P with a coating liquid G (coating agent), the pressing roller 57 (pressing member) that is movable and abuts on the coating roller 52 to form the nip (coating nip), the intermediate roller 53 (or the drawing roller 54) as an abutment member that abuts on the coating roller 52 at a position different from a position of the nip (coating nip), and the stopper 65 (or the stopper portion 69) as a restriction member that restricts movement of the coating roller 52 in the separation direction in which the coating roller 52 separates from the intermediate roller 53 (or the drawing roller 54) as an abutment member. Consequently, an amount of the coating liquid G with which a sheet P is coated is less like to vary.

In the present embodiment, the present disclosure is applied to the coating apparatus 50 as a preliminary-process apparatus of the inkjet printer 1. However, applications of the present disclosure are not limited to the present embodiment. The present disclosure can be applied to any coating apparatus that coats a sheet with a coating agent. In the present embodiment, the roller members (the coating roller 52, the pressing roller 57, and the intermediate roller 53 (or the drawing roller 54)) are used as a coating member, a pressing member, and an abutment member, respectively. On the contrary, at least one of the coating member, the pressing member, and the abutment member may be a belt member (endless belt) that travels in a predetermined direction. A pressing mechanism that presses the pressing roller 57 against the coating roller 52 is not limited to the pressing mechanism including, for example, the first pressing arm 61, the second pressing arm 62, the cam 63, the compressed spring 64 in the above-described embodiment and the pressing mechanism including, for example, the pressing roller 58, the pressing arm 68 as an urging member, and the compressed spring 75 in the modification example. A link mechanism, for example, may be used as the pressing mechanism. Even these cases also provide similar effects as the effects of the present embodiment.

It is clear that the present disclosure is not limited to the present embodiment, but the present embodiment can be appropriately modified within a scope of the technological concept of the present disclosure, in addition to suggestions in the present embodiment. Further, the numbers, positions, shapes, and the like of the components described above are not limited to the present embodiment. The appropriate numbers, positions, shapes, and the like of the components described above may be used to implement the present disclosure.

In the present description and the like, a "sheet" is not limited to paper but is defined as including all sheet-shaped recording media, such as coated paper, label paper, overhead projector (OHP) sheets, and metallic sheets.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A coating apparatus comprising:

a coating member configured to coat a sheet with a coating agent;

a pressing member that is movable and is configured to abut on the coating member to form a nip;

an abutment member configured to abut on the coating member at a position different from a position of the nip; and a restriction member configured to restrict movement of the coating member in a separation direction in which the coating member separates from the abutment member, wherein the restriction member includes a wedge-shaped member having an abutment surface sloping relative to a direction perpendicularly crossing the separation direction, and the abutment surface is configured to directly or indirectly abut on the coating member.

2. The coating apparatus according to claim 1, wherein the restriction member is configured to move between a restriction position at which the restriction member restricts movement of the coating member in the separation direction and a restriction cancellation position at which the restriction member does not restrict movement of the coating member in the separation direction.

3. The coating apparatus according to claim 2, further comprising:

an urging body configured to urge the restriction member toward the restriction position; and a movement mechanism configured to move the restriction member toward the restriction cancellation position against urging of the urging body.

4. The coating apparatus according to claim 3, wherein the movement mechanism is controlled so that the restriction member moves to the restriction position or the restriction cancellation position, according to a thickness of a sheet entering the nip.

5. The coating apparatus according to claim 1, further comprising an urging member configured to urge the pressing member to the coating member, wherein the urging member supports the restriction member.

6. The coating apparatus according to claim 5, wherein an orientation of the urging member is configured to change according to a thickness of a sheet entering the nip, and even if an orientation of the restriction member changes according to the change in the orientation of the urging member, the restriction member is configured to directly or indirectly abut on the coating member so that the coating member does not move in the separation direction.

7. The coating apparatus according to claim 6, wherein the urging member includes a pressing arm rotatable on a rotation shaft, and when the restriction member is seen in a cross section perpendicularly crossing the rotation shaft, a distance from an abutment surface of the restriction member configured to directly or indirectly abut on the coating member to the rotation shaft is substantially uniform even if the restriction member and the pressing arm rotate on the rotation shaft.

8. The coating apparatus according to claim 7, wherein when the restriction member is seen in a cross section perpendicularly crossing the rotation shaft, the abutment surface configured to directly or indirectly abut on the coating member is substantially arc-shaped so that a distance from the rotation shaft to the abutment surface is substantially uniform.

9. The coating apparatus according to claim 1, wherein the restriction member has an abutment surface configured to directly or indirectly abut on the coating member to restrict movement of the coating member in the separation direction, and a cut portion cut from the abutment surface so that the cut portion does not directly or indirectly abut on the coating member and does not restrict movement of the coating member in the separation direction.

10. The coating apparatus according to claim 1, wherein the coating member includes a shaft and is rotatable on the shaft, and the restriction member is configured to abut on the shaft to restrict movement of the coating member in the separation direction.

11. An image forming system comprising:

the coating apparatus according to claim 1; and an image forming apparatus configured to form an image on a sheet coated with a coating agent by the coating apparatus.

* * * * *